A. Hallowell,
Beer Faucet,
Nº 48,273. Patented June 20, 1865.

Witnesses:
G. R. Hale Jr
H. E. Fisher

Inventor:
Albert Hallowell
by his attorney
R. H. Eddy

UNITED STATES PATENT OFFICE.

ALBERT HALLOWELL, OF LOWELL, MASSACHUSETTS.

IMPROVEMENT IN BEER-FAUCETS.

Specification forming part of Letters Patent No. 48,273, dated June 20, 1865.

*To all whom it may concern:*

Be it known that I, ALBERT HALLOWELL, of Lowell, in the county of Middlesex and State of Massachusetts, have invented a new and useful Improvement in Faucets and their Connections, by which they are connected to a cask or barrel; and I do hereby declare the same to be fully described in the following specification and represented in the accompanying drawings, of which—

Figure 2:
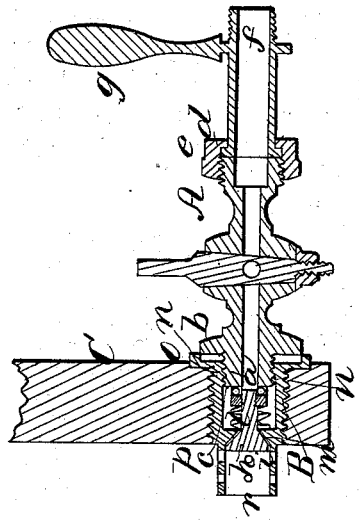
Figure 3:
Figure 1:
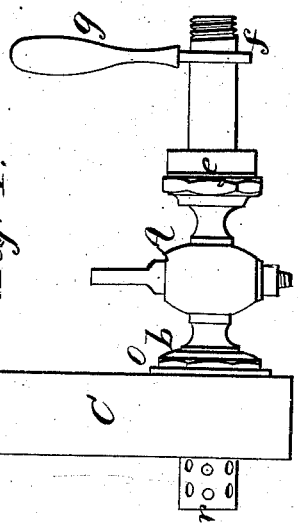

Figure 1 is a side view, and Fig. 2 a longitudinal section, of a faucet and its connection, as made in accordance with my invention and as applied together and to a barrel-head. Fig. 3 is a side view, and Fig. 4 a front elevation, of the screw-cap of the connection.

The principal purpose of my invention is to enable a faucet to be readily affixed to a cask or barrel when the latter may contain beer, ale, or any other liquor, and also to accomplish the fixation of the faucet therein without waste of the liquor, such as frequently and almost always takes place during the process of driving a faucet against a bung or cork and into the bung-hole thereof.

In the drawings, A denotes a faucet or cock having at its rear extremity a male screw, $a$, projecting from a circular disk or shoulder, $b$. The said screw $a$ is tubular, and provided with an extension or projection, $c$, which is perforated radially and endwise with one or more holes.

The discharging end or branch of the faucet may be made in any well-known manner. As represented in the drawings, however, it is shown as provided with a male screw, $d$, to receive a coupling, $e$, of a pipe, $f$, from which a handle, $g$, extends at or about at right angles to the axis of the said pipe. This handle is for the purpose of enabling a person to hold the pipe $f$ in a manner to prevent it or any extension of it from becoming twisted or revolved during the process of screwing up the coupling $e$.

In conjunction with the faucet made with the screw $a$ and the projection $c$, or the equivalent thereof, I employ a screw-connection, B, provided with a valve, $h$, arranged at its inner end and applied to a stem, $i$, which is furnished with a spring, $l$, for driving the valve closely against its seat $m$.

In advance of the valve-stem the connection B has an open mouth, constructed with a female screw, $n$, for the reception of the screw $a$ of the faucet. The screw $n$ is of such a length that during the process of screwing the connection-screw $a$ into it the projection $c$ shall be forced against the end of the valve-stem, so as to crowd the valve off its seat. Besides the screw $n$, the connection B is made with a socketed flange or bead, $o$, and also with a male screw, $p$, arranged on its external surface, as shown in Figs. 2 and 3. The connection may also have a tubular strainer or guard, $r$, surrounding the valve and projecting in rear thereof.

The connection B, when used, is to be screwed into the head C of a cask or barrel, in manner as shown in Fig. 2, and to remain fixed therein, such connection being held firmly in place by one or more screws extending through its socketed bead or flange, and screwed into the barrel-head.

Figure 4:
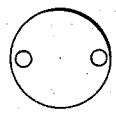

In this way it is intended that beer and wine casks may be fitted with the connection, which, when the faucets are not in place in them, may have screw-caps, such as are shown in Figs. 3 and 4, inserted in them and their socketed beads, such cap operating to protect the valves of the connections from being accidentally or otherwise opened by pressure against their stems.

In order to apply the faucet to the cask it will suffice to screw it into the connection B and closely up into the socketed bead thereof, in which case the faucet will open the valve, and so as to allow the liquor of the cask free access to the body of the faucet.

What I claim as my invention is as follows—that is to say:

1. The faucet-connection B, as made with the two screws $n$ and $p$, or their equivalents, provided with the valve and its seat, arranged substantially as specified.

2. The said faucet-connection B, as made with the bead $o$, combined with the screws $n$ and $p$, and the valve and its seat, arranged as described.

3. The said connection as made with the perforated guard or strainer $r$, the valve and seat, and the screws, arranged as specified.

4. The faucet constructed with the screw $a$ and the projection c, as arranged with the connection B, provided with a valve arranged within it, as specified.

5. The combination of the connection B, provided with a valve, and made with screws n and p, as described, with the faucet constructed with the screw a and the projection c, the whole being substantially as and for the purpose specified.

ALBERT HALLOWELL.

Witnesses:
R. H. EDDY,
F. P. HALE.